(12) United States Patent
Harasawa et al.

(10) Patent No.: US 6,506,470 B2
(45) Date of Patent: Jan. 14, 2003

(54) MAGNETIC RECORDING MEDIUM

(75) Inventors: Takeshi Harasawa, Odawara (JP); Hiroshi Hashimoto, Odawara (JP); Hitoshi Noguchi, Odawara (JP); Shinji Saito, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 72 days.

(21) Appl. No.: 09/855,574

(22) Filed: May 16, 2001

(65) Prior Publication Data
US 2002/0001737 A1 Jan. 3, 2002

(30) Foreign Application Priority Data

May 16, 2000 (JP) ........................................ 2000-143270

(51) Int. Cl.$^7$ ............................................... G11B 5/708
(52) U.S. Cl. ....................... 428/65.4; 428/323; 428/336; 428/694 BS; 428/694 BP; 428/694 BN; 428/900
(58) Field of Search ................................ 428/65.4, 323, 428/336, 694 BS, 694 BP, 900, 694 BN

(56) References Cited

U.S. PATENT DOCUMENTS 4,696,869 A * 9/1987 Funahashi et al. .......... 428/695
6,096,406 A * 8/2000 Yamazaki et al. .......... 428/141

* cited by examiner

Primary Examiner—Stevan A. Resan
(74) Attorney, Agent, or Firm—Sughrue Mion, PLLC

(57) ABSTRACT

The present invention provides a magnetic recording medium having high electromagnetic transfer characteristics in a high-density recording medium. The invention provides a magnetic recording medium, which comprises a nonmagnetic primer layer placed on a nonmagnetic support member and at least one layer of magnetic layers with ferromagnetic powder dispersed in a binder, said magnetic layer being placed on said primer layer, whereby diamond particles with average particle size of 0.05 to 1 $\mu$m are added to the magnetic layer, and at least one type of compound selected from the following genera formulae (1) and (2) is contained:

General formula (1)

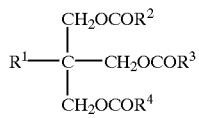

General formula (2)

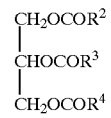

where $R^1$ represents an alkyl group having 1 to 2 carbon atoms; and $R^2$, $R^3$ and $R^4$ each represents a hydrocarbon group having 4 to 21 carbon atoms.

3 Claims, No Drawings

MAGNETIC RECORDING MEDIUM

BACKGROUND OF THE INVENTION

The present invention relates to a magnetic recording medium for high-density recording containing ferromagnetic fine powder as a magnetic layer. In particular, the invention relates to a magnetic recording medium having good storage property and high durability.

As magnetic recording medium for the applications in audio equipment, video equipment, computer, etc., a magnetic recording medium is used, which has a magnetic layer containing ferromagnetic powder dispersed in a binder, and the magnetic layer is placed on a nonmagnetic support member.

In recent years, digital recording with less deterioration of recording quality compared with conventional analog recording has been used widely in practical application, also in the field of video tape recorder for home use. In general, more signals must be recorded in digital recording than in analog recording. The recording and reproducing system and recording medium used for digital recording must provide high picture quality and high tone quality and also must be designed in more compact size and must have space-saving property. In this respect, there are strong demands on high-density recording.

To achieve high-density recording, it is necessary to turn the recording signals to shorter wavelength and recording track must be designed narrower. For this purpose, ferromagnetic powder must be finer powder with high filling ratio and the recording medium must have smoother surface. Also, writing speed and reading speed to and from the recording medium must be increased. Attempts are now being made to increase the number of revolutions of cylinder or to increase carrier speed of tape.

In the equipment or devices using the magnetic recording medium, there is problem in that magnetic head is contaminated because the medium and the magnetic head slide against each other. In particular, in the device for high density recording, number of revolutions of the magnetic head is high. In a digital video tape recorder, number of revolutions of the magnetic head is as high as 9,600 rpm, and this is much higher compared with 1,800 rpm of an analog video tape recorder for household use, and 5,000 rpm of a video tape recorder for business use.

With the increase of sliding speed between the magnetic recording medium and the magnetic head, there are now strong demands on the development of a magnetic recording medium, which has high durability and high resistance to damage and has high resistance to high speed sliding movement.

Not only for the tape-type magnetic recording medium, but also for disk-type magnetic recording medium, high-density magnetic recording medium is required, as typically represented by Zip (Iomega Inc.), which can be rotated at higher speed compared with the conventional type floppy disk. Thus, a magnetic recording medium with high durability and high resistance to wear and damage is required for this purpose.

To solve the above problems, for the purpose of providing a magnetic recording medium, which contains ferromagnetic metal powder dispersed in a binder and which has high durability in high density recording and can perform stabilized recording and reproduction, it is proposed to use a magnetic recording medium, which contains various types of lubricants in the magnetic layer. It is proposed to use various types of triester or tetraester compound as lubricant when ester is used as lubricant.

For instance, JP-88021255(B) describes the use of triester or tetraester lubricant obtained from trimethylolpropane, trimethylolethane or pentaerythritol. However, these lubricants have poor storage property, and the resistance to damage of the magnetic layer is low. In particular, the properties of this lubricant are not high enough for high-density recording medium such as digital recording tape.

Further, JP-B-61-26134 describes a magnetic recording medium using triester of trimethylolpropane as lubricant. However, it has poor storage property and low resistance to damage. Also, electromagnetic transfer characteristics are not high enough as a high-density magnetic recording medium.

Also, JP-59065931(A) describes a magnetic recording medium using a lubricant, which simultaneously uses triester of trimethylolpropane and other diester or tetraester and monoester. However, storage property of the magnetic layer is not sufficiently high, and the magnetic layer also has poor resistance to damage or wear. Further, these products are low in durability and have poor electromagnetic transfer characteristics.

JP-61139921(A) describes a magnetic recording medium, which uses fatty acid ester of polyhydric alcohol and phosphoric acid ester of phenoxydiethylene glycol as lubricants. But, this product has magnetic layer with low storage property and low resistance to damage. Further, the product has low durability and poor electromagnetic transfer characteristics.

Further, U.S. Pat. No. 4,696,869 (JP-95015748(B)) describes a magnetic recording medium, using ester or trimethylolpropane or ester of pentaerythritol and monoester as lubricants. However, the magnetic layer has low storage property and low resistance to damage. Further, this product has low durability and poor electromagnetic transfer characteristics in high-density recording.

Also, JP-2552958 proposes a magnetic recording medium, which can have higher electromagnetic transfer characteristics in short wavelength recording and which comprises a primer layer and a thin upper magnetic layer. In the prescription as disclosed, the product is not good enough in terms of durability.

JP-A-06052541(A) proposes a magnetic recording medium, which comprises a magnetic layer containing abrasive material with Morse hardness of 8 or more, whereby average height of projections of the abrasive material is 15 nm or less. However, this is not satisfactory to provide high durability.

Further, U.S. Pat. No. 6,096,406 (JP-11086273(A)) proposes a magnetic recording medium, which comprises a substantially nonmagnetic lower layer placed on a support member, and a magnetic layer containing ferromagnetic powder dispersed in a binder being placed thereon, whereby coercive force is set to 1800 Oe or more, and the magnetic layer contains diamond particles having average particle size of 0.1 to 1.0 $\mu$m. However, this is not satisfactory to provide high durability.

It is an object of the present invention to provide a magnetic recording medium having high durability. The invention provides a magnetic recording medium having high electromagnetic transfer characteristics in high-density recording. Further, the invention provides a magnetic recording medium having high calender moldability and superb surface smoothness.

SUMMARY OF THE INVENTION

The present invention provides a magnetic recording medium, which comprises a nonmagnetic primer layer placed on a nonmagnetic support member and at least one layer of magnetic layers with ferromagnetic powder dispersed in a binder, said magnetic layer being placed on said primer layer, whereby at least one type of compound selected from the following genera formulae (1) and (2) is contained:

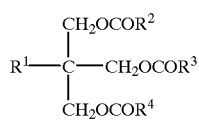

General formula (1)

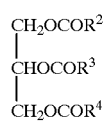

General formula (2)

where $R^1$ represents an alkyl group having 1 to 2 carbon atoms; and
$R^2$, $R^3$ and $R^4$ each represents a hydrocarbon group having 4 to 21 carbon atoms.

Also, the present invention provides the magnetic recording medium as described above, wherein thickness of the magnetic layer is within the range of 0.05 to 1 μm.

Further, the present invention provides the magnetic recording medium as described above, wherein said medium is a disk-type magnetic recording medium.

DESCRIPTION OF THE PREFERRED EMBODIMENT

The present invention provides a high-density magnetic recording medium, comprising a lubricant of specific chemical structure for the purpose of achieving high durability and high resistance to damage and good electromagnetic transfer characteristics.

In particular, it has been found in the present invention that, when a tetraester compound of the present invention is added at least to a primer layer which contains a nonmagnetic primer layer, and a magnetic layer is coated on the primer layer and dried, and is further processed by calender processing, very smooth magnetic layer can be obtained. Thus, a magnetic recording medium having high durability under high temperature and high speed operation can be obtained.

As the lubricant to be used in the present invention, it is preferable to use a tetraester compound expressed by the following general formula:

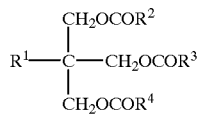

General formula (1)

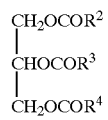

General formula (2)

where $R^1$ represents an alkyl group having 1 to 2 carbon atoms; and
$R^2$, $R^3$ and $R^4$ each represents a hydrocarbon group having 4 to 21 carbon atoms.

In the magnetic recording medium of the present invention, it is preferable that the medium contains at least a compound expressed by the general formulae (1) or (2).

Preferably, $R^1$ represents a methyl group or an ethyl group.

Also, $R^2$, $R^3$ and $R^4$ each preferably represents a hydrocarbon group having 8 to 17 carbon atoms. $R^2$, $R^3$ and $R^4$ may be the same or different from each other. In $R^2$, $R^3$ and $R^4$, if the number of carbon atoms in the hydrocarbon group is 4 or less, the product is too volatile. When the magnetic recording medium is turned to high temperature under friction, the quantity of the lubricant in the surface of the magnetic layer is decreased, and this results in lower durability. On the other hand, if the number of carbon atoms is increased, viscosity increases, and liquid lubricating property is decreased. As a result, durability is decreased.

As the hydrocarbon group, saturated hydrocarbon group or unsaturated hydrocarbon group may be used. In general, it is preferable to use saturated hydrocarbon group from the viewpoints of storage and stability. Also, branched or direct-chain hydrocarbon group may be used, while direct-chain group is preferably used because a magnetic recording medium with low viscosity and high durability can be obtained.

As the triester compound expressed by the general formula (1) or the general formula (2), the following compounds may be used:

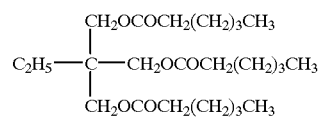

Compound A

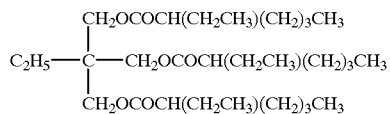

Compound B

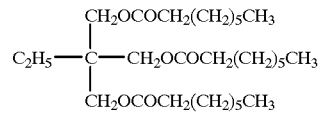

Compound C

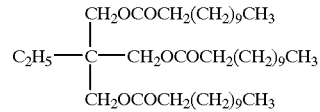

Compound D

-continued

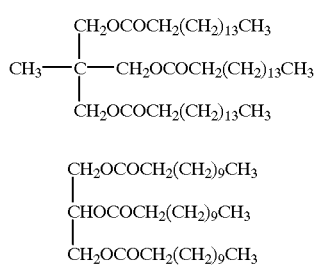

Compound E

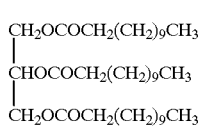

Compound F

It is preferable that the magnetic recording medium of the present invention contains 1 to 20 weight parts of the triester compound to 100 weight parts of the nonmagnetic powder. More preferably, it is in the range of 1 to 13 weight parts.

In the magnetic recording medium of the present invention, in addition to the lubricant comprising tetraester as expressed by the general formulae (1) or (2), an additive having lubricating effect, anti-static effect, dispersing effect, plasticizing effect, etc. may be used. For example, molybdenum disulfide, tungsten disulfide, graphite, boron nitride, graphite fluoride, silicone oil, silicone having polar group, fatty acid denatured silicone, fluorine-containing silicone, fluorine-containing alcohol, fluorine-containing ester, polyolefin, polyglycol, alkyl phosphoric acid ester and its alkali metal salt, alkyl sulfuric acid ester and its alkali metal salt, polyphenylether, phenylphosphonic acid, aminoquinones, various types of silane coupling agents, titanium coupling agents, fluorine-containing alkyl sulfuric acid ester and its alkali metal salt, monobasic fatty acid having 10 to 24 carbon atoms (may contain unsaturated bonding or may be branched) and metal salt (such as Li, Na, K, Cu, etc.), or monohydric, dihydric, trihydric, tetrahydric, pentahydric, or hexahydric alcohol having 12 to 22 carbon atoms (may contain unsaturated bonding or may be branched), alkoxy alcohol having 12 to 22 carbon atoms, mono-fatty acid ester or di-fatty acid ester comprising either one of monobasic fatty acid having 10 to 24 carbon atoms (may contain unsaturated bonding or may be branched) or monohydric, dihydric, trihydric, tetrahydric, pentahydric or hexahydric alcohol having 2 to 12 carbon atoms (may contain unsaturated bonding or may be branched), or fatty acid ester of monoalkylether of alkylene oxide polymerized product, fatty acid amide having 8 to 22 carbon atoms, aliphatic amine having 8 to 22 carbon atoms, etc. may be used.

As the monoester compound, it is preferable to use saturated fatty acid monoester, unsaturated fatty acid monoester, ester of alkylene oxide added alcohol and fatty acid, etc.

Also, it is preferable to use n-butyl stearate, sec-butyl stearate, n-butyl palmitate, n-butyl myristate, isoamyl stearate, isoamyl palmitate, isoamyl myristate, 2-ethylhexyl stearate, 2-ethylhexyl palmitate, 2-ethylhexyl myristate, oleyl oleate, oleyl stearate, stearyl stearate, butoxyethyl stearate, butoxydiethylene glycol stearate, etc.

As the fatty acid, it is preferable to use palmitoleic acid, oleic acid, erucic acid, linoleic acid, stearic acid, palmitic acid, myristic acid, etc.

As the binder suitable for the magnetic layer and the primer layer, thermoplastic resin, thermosetting resin, reactive resin or mixture of these compounds may be used. As the thermoplastic resin, it is preferable to use the resin, which has glass transition temperature of $-100°$ C. to $+150°$ C., number average molecular weight of 1,000 to 200,000, or more preferably 10,000 to 100,000, and degree of polymerization of about 50 to 1,000 may be used.

As these compounds, polymer or copolymer containing the following substance as constituent units or polyurethane resin, or various types of rubber type resin may be used: vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinylbutyral, vinylacetal, vinylester, etc. As the thermosetting resin or reactive resin, phenol resin, epoxy resin, polyurethane curing resin, urea resin, melamine resin, alkyd resin, acryl type reactive resin, formaldehyde resin, silicone resin, epoxy-polyamide resin, mixture of polyester resin and isocyanate prepolymer, mixture of polyester polyol and polyisocyanate, mixture of polyurethane and polyisocyanate, etc. may be used. For further details on these resin compounds, reference should be made to: "Handbook of Plastics" published by Asakura Shoten Co., Ltd. Electron beam curing resin already known in the art may be used in each of the above layers. The examples and the manufacturing method are described in detail in JP-A-62-256219. The above resin compounds may be used alone or in combination. As the preferable combinations, a combination of polyurethane resin with at least one type selected from vinyl chloride resin, vinyl chloride-vinyl acetate copolymer, vinyl chloride-vinyl acetate-vinyl alcohol copolymer, or vinyl chloride-vinyl acetate-maleic acid anhydride copolymer, or a combination of polyisocyanate with these compounds may be used.

The tetraester compound of the present invention has high affinity to vinyl chloride type binder or polyurethane type binder, and it is preferable to use these compounds as the binder. In particular, as the binder used in the primer layer, it is preferable to use vinyl chloride type binder or polyurethane type binder.

The vinyl chloride type binder may be copolymerized with the following compounds: acrylic or methacrylic monomer such as alkyl acrylate, alkyl methacrylate, etc., allyl ether such as allylalkylether, fatty acid vinyl ester such as vinyl acetate, vinyl propionate, etc., vinyl monomer such as styrene, ethylene, butadiene, etc., and further, monomer having functional groups such as hydroxyl group, epoxy group, etc. or polar group as to be described later.

As the polyurethane, polyester urethane, polyether urethane, polyetherester urethane, acrylic polyurethane, etc. may be used.

The polyurethane having glass transition temperature (Tg) of $-50°$ C. to $+200°$ C. is preferably used, or more preferably $20°$ C. to $100°$ C. If glass transition temperature is too low, durability is decreased. If it is too high, calender moldability is decreased, and this leads to poor smoothness and low electromagnetic transfer characteristics.

In the binder, it is preferable that $-COOM$, $-SO_3M$, $-SO_4M$, $-PO(OM)_2$, $-OPO(OM)_2$, amino group, quaternary ammonium base, etc. are introduced as polar groups in an amount of $1\times10^{-5}$ eq/g to $2\times10^{-4}$ eq/g. If the amount of these polar groups is lower than $1\times10^{-5}$ eq/g, dispersion property is decreased. If it is higher than $2\times10^{-4}$ eq/g, dispersion property is also decreased.

It is preferable that OH group is introduced as curing functional group with isocyanate curing agent, or epoxy group, SH group, CN group, $-NO_2$ group, etc. may be introduced.

It is preferable that the binder including curing agent is contained in the magnetic layer in an amount of 10 to 25 weight parts to 100 weight parts of the ferromagnetic powder.

As concrete examples of the binders to be used in the present invention, the following products may be used: VAGH, VYHH, VMCH, VAGF, VAGD, VROH, VYES, VYNC, VMCC, XYHL, XYSG, PKHH, PKHJ, PKHC, and PKFE (manufactured by Union Carbide Corporation), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W and 100FD (manufactured by Denki Kagaku K.K.), MR-104, MR-105, MR110, MR100, MR555, and 400X-110A (manufactured by Nippon Zeon Co., Ltd.), Nipporan N2301, N2302, and N2304 (manufactured by Nippon Polyurethane Co., Ltd.), Pandex T-5105, T-R3080, T-5201, Barnock D-400, D-210-80, Crisbon 6109, and 7209 (manufactured by Dainippon Ink & Chemicals, Inc.), Vylon UR8200, UR8300, UR-8700, RV530, and RV280 (manufactured by Toyobo Co., Ltd.), Daiphelamine 4020, 5020, 5100, 5300, 9020, 9022, and 7020 (manufactured by Dainichi Seika Co., Ltd.), MX5004 (manufactured by Mitsubishi Chemical Corporation), Sanprene SP-150 (manufactured by Sanyo Kasei Co., Ltd.), and Saran F310 and F210 (manufactured by Asahi Chemical Industry Co., Ltd.).

As the ferromagnetic powder to be used in the magnetic layer of the present invention, it is preferable to use ferromagnetic alloy powder containing α—Fe as main component. The ferromagnetic powder may contain the following elements in addition to the atoms as already designated: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, etc. In particular, it is preferable that at least one of Al, Si, Ca, Y, Ba, La, Nd, Co, Ni or B is contained in addition to α—Fe, or more preferably at least one of Co, Y or Al. The content of Co is preferably 0 to 40 atom % inclusive to α—Fe, or more preferably 15 to 35 atom % inclusive, or most preferably 20 to 35 atom % inclusive. The content of Y is preferably 1.5 to 12 atom % inclusive to α—Fe, or more preferably 3 to 10 atom % inclusive, or most preferably 4 to 9 atom % inclusive. The content of Al is preferably 5 to 30 atom % inclusive to α—Fe, or more preferably 5 to 15 atom % inclusive, or most preferably 7 to 12 atom % inclusive. The ferromagnetic powder may be processed in advance with dispersing agent, lubricant, surface active agent, anti-static agent, etc. before dispersion. More concretely, the details are described in: JP-69014090 (B), JP-70018372(B), JP-72022062(B), JP-72022513(B), JP-71028466(B), JP-71038755(B), JP-72004286(B), JP-72012422(B), JP-72017284(B), JP-72018509(B), JP-7218573(B), JP-64010307(B), JP-71039639(B), U.S. Pat. No. 3,026,215, U.S. Pat. No. 3,031,341, U.S. Pat. No. 3,100,194, U.S. Pat. No. 3,242,005, US-3,389,014, etc.

A small quantity of hydroxides or oxides may be contained in the ferromagnetic alloy powder. The ferromagnetic alloy powder obtained by the manufacturing methods already known may be used in the present invention, and the following methods may be used: A method to reduce complex organic acid salt (mainly oxalic acid salt) using the reducing gas such as hydrogen, a method to obtain Fe or Fe—Co particles by reducing ion oxide with reducing gas such as hydrogen, a method to thermally decompose metal carbonyl compound, a method to reduce by adding reducing agent such as sodium borohydride, hypophosphite or hydrazine to aqueous solution of ferromagnetic metal, a method to obtain fine powder by evaporating metal in an atmosphere of inert gas under low pressure, etc. The ferromagnetic alloy powder thus obtained may be processed by one of the following methods: a method for gradual oxidation, i.e. a method to dry after immersing in organic solvent, a method to immerse in organic solvent and to form oxide film on the surface by oxygen-containing gas and to dry, or a method to form oxide film on the surface by adjusting partial pressure of oxygen gas and inert gas without using organic solvent.

If the ferromagnetic powder in the magnetic layer of the present invention is expressed by specific surface area according to BET method, it is 45 to 80 $m^2/g$, or more preferably 50 to 70 $m^2/g$. If it is lower than 40 $m^2/g$, noise increases. If it is 80 $m^2/g$ or more, good surface property is not obtained and this is not desirable. Crystallite size of the ferromagnetic powder of the magnetic layer of the present invention is 8 to 35 nm, or more preferably 10 to 25 nm, or most preferably 14 to 20 nm. Longer axis diameter of the ferromagnetic powder is 0.02 to 0.25 $\mu$m inclusive, or more preferably 0.05 to 0.15 $\mu$m inclusive, or most preferably 0.06 to 0.1 $\mu$m inclusive. Acicular ratio of the ferromagnetic powder is preferably 3 to 15 inclusive, or more preferably 5 to 12 inclusive. The value of σs of the magnetic metal powder is preferably 100 to 180 $Am^2/kg$ (emu/g), or more preferably 110 to 170 $Am^2/kg$ (emu/g), or most preferably 125 to 160 $Am^2/kg$ (emu/g). Coercive force of metal powder is preferably 111.4 kA/m to 278.5 kA/m inclusive, or more preferably 143.3 kA/m to 238.7 kA/m inclusive.

It is preferable that moisture content of the ferromagnetic powder is in the range of 0.01% to 2%. It is preferable to optimize the moisture content of the ferromagnetic powder depending on the type of the binder. It is preferable to adjust pH value of the ferromagnetic powder by adjusting combination with the binder used. The preferable pH range is 4 to 12, or it is more preferably 6 to 10. The ferromagnetic powder may be processed by surface treatment using Al, Si, P or oxide of these elements. The amount of the processed part is preferably 0.1 to 10% of total ferromagnetic powder. When it is processed by surface treatment, adsorption of lubricant by fatty acid or the like is reduced to 100 $mg/M^2$ or lower, and this is desirable. The ferromagnetic powder may contain soluble inorganic ions such as Na, Ca, Fe, Ni, Sr, etc. It is preferable that these are not present, but even when these are present, if it is in concentration of less than 200 ppm, the properties of the product are not particularly affected. It is preferable that the ferromagnetic powder used in the present invention has less voids. The percentage of the voids contained is preferably 20 vol % or less, or more preferably 5 vol % or less. The shape of the ferromagnetic powder may be any of needle-like, grain-like or spindle-like shape so far as it satisfies the properties for the particle size. Inverted magnetic field distribution (SFD) of the ferromagnetic powder itself is preferably lower, i.e. 0.8 or lower. The distribution of the value of Hc of the ferromagnetic powder must be lower. If SFD is 0.8 or lower, the product has good electromagnetic transfer characteristics and higher output. Magnetization inversion is sharp, and peak shift occurs less frequently, and the product is suitable for high-density digital magnetic recording. To decrease distribution of Hc, there are methods such as a method to increase particle size distribution of goethite in the ferromagnetic powder or a method to prevent sintering.

As the ferromagnetic powder used in the magnetic layer of the present invention, hexagonal crystal ferrite powder may be used.

As the hexagonal crystal ferrite, substituent of barium ferrite, strontium ferrite, lead ferrite, calcium ferrite, or Co substituent may be used. More concretely, magnetoplumbite type barium ferrite and strontium ferrite, magnetoplumbite type ferrite with particle surface covered with spinel, or magnetoplumbite type barium ferrite and strontium ferrite partially containing spinel phase may be used. It may contain, in addition to the designated atoms, the following atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc. In general, substances added with element such as Co—Ti, Co—Ti—Zr, Co—Ti—Zn, Ni—Ti—Zn, Nb—Zn—Co, Sb—Zn—Co, Nb—Zn, etc. may be used. These substances containing impurities, which are unavoidably contained due to raw materials and manufacturing methods, may be used.

Particle size is preferably 10 to 200 nm in hexagonal diameter, or more preferably 20 to 100 nm.

When reproduction is performed on the magnetic resistance head, it is necessary to decrease noise, and the plate diameter of 40 nm or lower is preferable. If it is lower than 10 nm, stable magnetization cannot be achieved due to thermal fluctuation. If it is 200 nm or more, noise is increased. None of these cases is suitable for high-density magnetic recording. Planar ratio (plane diameter/plane thickness) is preferably in the range of 1 to 15, or more preferably 2 to 7. If planar ratio is lower, filling ratio in the magnetic layer is increased and this is desirable, but orientation property is not good enough. If it is higher than 15, noise is increased due to stacking between particles. Specific surface area according to BET method of the particle size range is 10 to 200 m$^2$/g. Specific surface area approximately agrees with the value arithmetically calculated from particle plate diameter and plate thickness. Crystallite size is preferably 5 to 45 nm, or more preferably 10 to 35 nm. Normally, the narrower the distribution of particle plate diameter and plate thickness is, the more it is desirable. Quantification in numerical value is difficult to perform, but comparison can be made by measuring 500 particles at random on the photograph taken under transmission electronic microscope (TEM).

Distribution is usually not normal distribution. If it is calculated and expressed in standard deviation to mean size, it is: σ/mean size=0.1 to 2.0. To make the particle size distribution sharper, reaction system to generate particles is turned to more homogeneous, and distribution improving processing is carried out on the generated particles. For instance, a method is known, in which ultra-fine particles are selectively dissolved in acid solution. Coercive force (Hc) of the magnetic material can be produced to 39.8 to 397.9 kA/m. The higher the value of Hc is, the more advantageous it is for high-density recording, but there is limitation due to the ability of the recording head. Normally, it is up to about 63.7 to 318 kA/m, or more preferably 119 kA/m to 279 kA/m. In case saturation magnetization of the head exceeds 1.4 Tesla, it is preferable to set the value of Hc to 159 kA/m or more. The value of Hc can be controlled by particle size (plate diameter and plate thickness), type and quantity of the elements contained, substitution site of element, and reactive condition to generate particles. Saturation magnetization (σs) is in the range of 40 to 80 Am$^2$/kg. The higher the value of σs is, the more it is desirable. The finer the particles are, the more the value of σs decreases. Various methods are known to improve the value of σs, i.e. a method to combine spinel ferrite with magnetoplumbite ferrite, or a method to select type and adding quantity of the elements. Also, W type hexagonal crystal ferrite may be used.

When the magnetic material is dispersed, the surface of the magnetic particles may be processed using a dispersion agent or a material suitable for polymer. As surface processing material, inorganic compound or organic compound is used. Typical compounds used are: oxide or hydroxide of Si, Al, P, etc., various types of silane coupling agents, or various types of titanium coupling agents. The adding quantity is 0.1 to 10 weight parts to 100 weight parts of the magnetic material.

For the dispersion, pH value of the magnetic material is important. It is normally about 4 to 12, and optimal value is determined according to the dispersion agent and polymer. For chemical stability and preservation property of the medium, pH value of about 6 to 10 is generally chosen. Moisture content in the magnetic material also exerts influence on dispersion. There is the optimal value depending on the dispersion agent and polymer. Normally, the values of 0.01 to 2.0 weight % is selected.

The following methods are used to produce hexagonal crystal ferrite: (1) Metal oxide to substitute barium oxide, iron oxide and iron are mixed with boron oxide to use as glass generating substance to obtain ferrite composition as desired. Then, the mixture is melted and quickly cooled to turn to amorphous substance. Then, it is heated again and is then washed and pulverized to barium ferrite crystal powder. This is called glass crystallization method. (2) Solution of barium ferrite composition metal salt is neutralized with alkali. After removing side products, it is heated in liquid phase at 100° C. or more. Then, it is washed, dried and pulverized, and barium ferrite crystal powder is obtained. This is called hydrothermal reaction method. (3) Solution of barium ferrite composition metal salt is neutralized with alkali. After removing side products, it is dried and processed at temperature of lower than 1100° C. Then, it is pulverized and barium ferrite crystal powder is obtained. This is called coprecipitation method. Any of the above methods may be used.

The diamond particles used in the present invention preferably has average particle size in the range of 0.05 to 1.0 μm, or more preferably in the range of 0.05 to 0.8 μm. If average particle size is less than 0.05 μm, the effect to improve durability is decreased. On the other hand, if it exceeds 1.0 μm, durability is high, but surface property of the magnetic layer is decreased, and electromagnetic transfer characteristics are poor. In the present invention, maximum diameter of each diamond particle is defined as particle diameter, and the term "average particle size" used in the present invention is defined as an average value of the measured particle diameters in 500 particles randomly sampled and photographed under electronic microscope.

Adding quantity of the diamond particles is preferably 0.01 to 5 weight % to the ferromagnetic powder, or more preferably 0.03 to 3.00 weight %. If it is less than 0.01 weight %, it is difficult to maintain durability. If it is more than 5 weight %, the effect to decrease noise by addition of diamond particles is lowered. From the viewpoints of noise and durability, adding quantity and average particle size of the diamond particles are limited to the above range. From the viewpoint of noise, it is preferable that the adding quantity of the diamond particles is as low as possible. In the magnetic recording medium of the present invention, it is preferable that the adding quantity and the average particle size of the diamond particles are suitable for magnetic recording and reproducing system adequately selected from the above range.

As particle size distribution of the diamond particles, it is preferable that the number of particles having particles size of more than 200% of average particle size is 5% or less of the total number of diamond particles, and that the number of particles having particle size of 50% of average particle size accounts for 20% or less of the total number of the diamond particles.

To determine particle size distribution, the number of particles is counted with average particle size as reference when the particle size as given above is determined. The particle size distribution of the diamond particles exerts influence on durability and noise. When particle size distribution is more extensive than the above range, the effects to match average particle size as set in the present invention may be changed. Specifically, if there are more particles with larger particle size, noise may increase or head may be damaged. If there are more particles with finer particle size, polishing effects are not satisfactory. The diamond particles with extremely narrow particle size distribution are more expensive in cost, and it is more advantageous to use the diamond particles in the above range in terms of cost. Diamond particles have high hardness. When the diamond particles are used, which have sharp particle size distribution and in finer particle size as in the present invention, the same polishing effects can be obtained with less quantity of abrasives compared with the conventional case, and this is advantageous from the viewpoint of noise.

Further, abrasives used commonly in the past, e.g. abrasives such as alumina, SiC, etc. may be simultaneously used with the diamond particles in the present invention. When small quantity of diamond particles only is used, effects on durability and S/N ratio are satisfactory. From the reasons such as cost, other abrasives such as alumina, silicon carbide, etc. may be added. In this case also, the diamond particles are added, and adding quantity of alumina can be decreased compared with the quantity necessary to maintain durability, and this is desirable from the viewpoints such as maintenance of durability or the decrease of noise.

Inorganic powder used in the primer layer of the present invention is nonmagnetic powder. For example, inorganic powder can be selected from inorganic compound such as metal oxide, metal carbonate, metal sulfate, metal nitride, metal carbide, metal sulfide, etc. As the inorganic compounds, the following substances are used in combination or alone: For example, α-alumina with alpha ratio of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, it is preferable to use titanium dioxide, zinc oxide, iron oxide or barium sulfate. More preferably, titanium dioxide or α-iron oxide is used because particle size distribution is lower and there are many means for providing the functions.

Particle size of the non-magnetic powder is preferably in the range of 0.005 to 2 $\mu$m. When necessary, non-magnetic powder with different particle sizes may be mixed together or similar effect can be provided with single type of non-magnetic powder by widening the particle size distribution. In particular, it is preferable that average particle size of the non-magnetic powder is 0.01 to 0.2 $\mu$m. In case nonmagnetic powder is particulate metal oxide, average particle size is preferably 0.08 $\mu$m or lower. In case it is needle-like metal oxide, it has preferably longer axis diameter of 0.3 $\mu$m or less. Tap density is 0.05 to 2 g/ml, or more preferably 0.2 to 1.5 g/ml. Moisture content of the nonmagnetic powder is preferably 0.1 to 5 weight %, or more preferably 0.2 to 3 weight %, or most preferably 0.3 to 1.5 weight %. Also, pH value of the nonmagnetic powder is preferably in the range of 2 to 11, or more preferably 5.5 to 10. Specific surface area of the nonmagnetic powder is preferably in the range of 1 to 100 $m^2$/g, or more preferably 5 to 80 $m^2$/g, or most preferably 10 to 70 $m^2$/g. Crystallite size of the nonmagnetic powder is preferably in the range of 0.004 to 1 $\mu$m, or more preferably 0.04 to 0.1 $\mu$m. Oil absorption using DBP (dibutyl phthalate) is preferably in the range of 5 to 100 ml/100 g, or more preferably 10 to 80 ml/100 g, or most preferably 20 to 60 ml/100 g. Specific gravity is preferably in the range of 1 to 12, or more preferably 3 to 6. The shape of the nonmagnetic powder may be any of needle-like, spherical, polygonal, or planar shape.

Ignition loss is preferably 20 weight % or less. Most preferably, there is no ignition loss. Morse hardness of the nonmagnetic powder used in the present invention is preferably 4 or more and 10 or less. Roughness factor of the surface of the powder is preferably in the range of 0.8 to 1.5, or more preferably 0.9 to 1.2.

Stearic acid adsorption of the nonmagnetic powder is preferably in the range of 1 to 20 $\mu$mol/$m^2$, or more preferably 2 to 15 $\mu$mol/$m^2$, or most preferably 3 to 8 $\mu$mol/$m^2$. Heat of wetting of the nonmagnetic powder to water at 25° C. is preferably in the range of 0.2 to 0.6 J/$m^2$. Also, a solvent with heat of wetting in the above range can be used. It is preferable that pH value is in the range of 3 to 6. The nonmagnetic powder preferably contains water-soluble sodium in the range of 0 to 150 ppm, and water-soluble calcium in the range of 0 to 50 ppm. It is preferable that surface of the non-magnetic powder is processed by surface treatment using $Al_2O_3$, $SiO_2$, $TiO_2$, $ZrO_2$, $SnO_2$, $Sb_2O_3$, $ZnO_2$ or $Y_2O_3$. To ensure better dispersion property, it is preferable to use $Al_2O_3$, $SiO_2$ or $ZrO_2$. These substances may be used in combination or alone. According to each individual purpose, coprecipitated surface treatment layer may be used, or a method to treat the surface layer using silica after treating with alumina, or a method reversing this procedure may be adopted. The surface treatment layer may be porous according to the purpose. In general, it is preferably homogeneous and dense.

Concrete examples of the nonmagnetic powder used in the primer layer of the present invention are: Nanotite (manufactured by Showa Denko Co., Ltd.), HIT-100 and ZA-G1 (manufactured by Sumitomo Chemical Industry Co., Ltd.), α-hematite DPN-250, DPN-250BX, DPN-245, DPN-270BX, DBN-SA1, and DBN-SA3 (manufactured by Toda Industry Co., Ltd.), titanium oxide TTO-51B, TTO-55A, TTO-55B, TTO-55C, TTO-55S, TTO-55D, SN-100, α-hematite E270, E271, E300, and E303 (manufactured by Ishihara Industry Co., Ltd.), titanium oxide STT-4D, STT-30D, STT-30, STT-65C, and α-hematite α-40 (manufactured by Titanium Industry Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Japan Aerogil), and 100A and 500A and fired products of these materials (manufactured by Ube Industries, Ltd.). The most preferable nonmagnetic powders are titanium dioxide and α-iron oxide.

When carbon black is mixed in the primer layer, it is possible to decrease surface electrical resistance Rs as already known, and light transmittance can be decreased. Also, micro-Vickers hardness as desired can be obtained. Further, by adding carbon black to the primer layer, it is possible to obtain good effect for storage of lubricant. The types of carbon black used for this purpose are: Furnace black for rubber, thermal black for rubber, black for color, acetylene black, etc. In the carbon black to be added to the primer layer, the following properties should be optimized, and when these are simultaneously used, better effects can be attained.

Specific surface area of the carbon black is preferably 100 to 500 $m^2$/g, or more preferably 150 to 400 $m^2$/g. DBP oil absorption is preferably 20 to 400 ml/100 g, or more preferably 30 to 200 ml/100 g. Particle size of the carbon black is preferably 5 to 80 nm, or more preferably 10 to 50 nm, or most preferably 10 to 40 nm. In the carbon black, it is preferable that pH value is 2 to 10, moisture content is 0.1 to 10%, and tap density is 0.1 to 1 g/ml. Concrete examples of the carbon black to be used in the present invention are as follows: Blackpearls 2000, 1300, 1000, 900, 800, 880, 700, and Vulcan XC-72 (manufactured by Cabot), #3050B, #3150B, #3250B, #3750B, #3950B, #950, #650B, #970B, #850B, MA-600, MA-230, #4000, and #4010 (manufactured by Mitsubishi Chemical Industry Co., Ltd.), Conductex SC, Raven 8800, 8000, 7000, 5750, 5250, 3500, 2100, 2000, 1800, 1500, 1255, and 1250 (manufactured by Columbia Carbon Co.), and Ketchenblack EC (manufactured by Akzo). Carbon black may be processed by surface treatment using dispersion agent, or it may be graphitized with resin and used, or a part of the surface may be graphitized and used. Carbon black may be dispersed with the binder in advance before it is added to the coating material. These types of carbon black can be used within the range not exceeding 50 weight % to the inorganic powder and within the range not exceeding 40% of total weight of the primer layer. These types of carbon black may be used alone or in combination. For further details of the carbon black to be used in the present invention, reference should be made to: "Handbook of Carbon Black" (compiled by Carbon Black Association of Japan).

Also, organic powder may be added to the primer layer. For example, acrylstyrene type resin powder, benzoguanamine resin powder, melamine resin powder, or phthalocyanine type pigment may be used. Also, polyolefin type resin powder, polyester type resin powder, polyamide type resin powder, polyimide type resin powder, or polyfluoride ethylene resin may be used. The methods for manufacturing these types of resin powder are described in JP-62018564 (A) and JP-600255827 (A)

As the binder resin, lubricant, dispersion agent, additive, solvent, dispersing procedure, etc. of the primer layer, those for the magnetic layer as described below can be applied. In particular, for the quantity and type of resin in the binder, adding quantity and type of the additive and dispersion agent, the technique already known for the magnetic layer can be applied.

The content of the binder in the primer layer is preferably 15 to 40 weight parts to 100 weight parts of the nonmagnetic powder, and it is preferable that the content of the binder is higher in the lower layer.

A coating solution prepared from the above materials is coated on a nonmagnetic support member, and a lower nonmagnetic layer is formed. As the nonmagnetic support member to be used in the present invention, polyethylene naphthalate, polyethylene terephthalate, polyamide, polyimide, polyamideimide, aromatic polyamide, polybenzoxidazole, etc. processed by biaxial stretching may be used. More preferably, polyethylene naphthalate and aromatic polyamide may be used. These nonmagnetic support member may be processed in advance by corona discharge, plasma treatment, process to make more easily adhesive, heat treatment, etc. Also, the nonmagnetic support member used in the present invention preferably has surface with good smoothness, i.e. average surface roughness on the central line in the range of 0.1 to 20 nm, or more preferably 1 to 10 nm with cutoff value of 0.25 mm. Also, it is preferable that these nonmagnetic support members have not only lower average surface roughness on the central line but also have no coarse projection of higher than 1 µm.

The thickness of the nonmagnetic support member of the magnetic recording medium of the present invention is preferably in the range of 4 to 100 µm.

On the surface not coated with the magnetic coating material of the nonmagnetic support member of the present invention, a back-coating layer (backing layer) may be provided. The back-coat layer is a layer coated on the surface of the nonmagnetic support member where the magnetic coating material is not coated and where a coating material for forming the back-coat layer is coated. The coating material for forming the back-coat layer is obtained by dispersing granular components such as abrasives, antistatic agents, etc. and a binder in organic solvent. As the granular components, various types of inorganic pigments or carbon black may be used. As the binder, nitrocellulose, phenoxy resin, vinyl chloride type resin, or polyurethane may be used alone or as a mixture of these components. An adhesive layer may be provided on the surface where the magnetic coating material and the coating material for forming the back-coat layer is coated on the nonmagnetic support member of the present invention.

To produce the magnetic recording medium of the present invention, a coating solution for the primer layer and a magnetic coating solution are coated to a given thickness on the surface of the nonmagnetic support member under running condition. The coating solution for the primer layer and the coating solution for the magnetic layer may be coated sequentially or in multiple layers at the same time. As the coating device to coat the coating solution for the primer layer or the magnetic coating solution, the following devices may be used: air doctor coat, blade coat, rod coat, extrusion coat, air knife coat, squeeze coat, impregnation coat, reverse roll coat, transfer roll coat, gravure coat, kiss coat, cast coat, spray coat, spin coat, etc.

For further details, reference should be made, for example, to "The Newest Coating Technique" published by Sogo Gijutsu Center, Ltd. (May 31, 1983). In case the present invention is applied to a magnetic recording medium, the following can be recommended as examples of the coating device and method:

(1) Using a coating device such as gravure, roll, blade, extrusion, etc. generally applied in the coating of the coating material, the primer layer is coated at first. While the primer layer is not yet dried, the upper layer is coated using a support pressurizing type extrusion coating device as disclosed, for example, in JP-B-88046186, JP-A-60-238179, JP-A-2-265672, etc.

(2) Using a coating head having two slits for allowing the coating solution to pass as disclosed in JP-A-63-88080, JP-A-2-17971 or JP-A-2-265762, the upper and the lower layers are coated almost at the same time.

(3) Using an extrusion coating device equipped with backup roll as disclosed in JP-A-2-174965, the upper and the lower layers are coated almost at the same time. The coating layer of the coating solution for the magnetic layer is dried after magnetic field orientation processing is performed on the ferromagnetic powder contained in the coating layer of the coating solution for the magnetic layer.

After it has been dried as described above, surface smoothening treatment is carried out on the coating layer. For the surface smoothening treatment, super calender roll is used, for example. By the surface smoothening treatment, the voids generated due to removal of the solvent during drying are eliminated, and filling ratio of the ferromagnetic powder in the magnetic layer is improved. This makes it possible to obtain a magnetic recording medium having high electromagnetic transfer characteristics. As the calender processing roll, heat-resistant plastic roll made of epoxy resin, polyimide, polyamide, polyamideimide, etc. is used. Or, a metal roll may be used.

To perform the processing, the magnetic layer formed by selecting a specific type of ferromagnetic powder and binder as described above is processed by the above calender processing. The conditions for the calender processing are as follows: The temperature of calender roll is preferably in the range of 60° C. to 100° C., or more preferably 70° C. to 100° C., or most preferably 80° C. to 100° C. The pressure is preferably within the range of 98.0 to 490 kN/m, or more preferably 196 to 441 kN/m, or most preferably 294 to 392 kN/m. The magnetic recording medium thus obtained can be cut to the size as desired using a cutter.

The thickness of the magnetic layer of the magnetic recording medium of the present invention is preferably in the range of 0.05 to 1 μm. Because the thickness of the magnetic layer is set to as thin as 0.05 to 1 μm in the magnetic recording medium of the present invention, a magnetic recording medium having high electromagnetic transfer characteristics can be obtained.

On the other hand, in case a thin magnetic layer is provided directly on the nonmagnetic support member, durability may not be satisfactory even when triester compound with excellent lubricating property may be added. Also, smoothness of the magnetic layer is not satisfactory. Noise is high, and high electromagnetic transfer characteristics cannot be obtained. However, when the primer layer is formed as in the present invention and the triester compound is added at least to the primer layer, if the magnetic layer is coated on it and dried and is further processed by calendering, the surface with superb smoothness having average surface roughness on the central line in the range of 1.0 to 3.5 nm, or more preferably 1.0 to 3.0 nm with cutoff value of 0.25 mm can be obtained.

As described above, the magnetic recording medium of the present invention is characterized in that a magnetic layer with very smooth surface can be formed, and it has high durability—in particular, high durability under high temperature and high speed conditions.

In particular, the combination with the primer layer is important for the improvement of the surface smoothness, and such smoothness cannot be expected in the conventional type magnetic recording medium with single magnetic layer.

Even when the tetraester compound is added only to the primer layer, it comes out gradually to the surface of the magnetic layer after the magnetic recording medium has been produced, and the effects to improve the durability are high.

(Embodiments)

In the following, description will be given on examples of the present invention to explain the features of the invention. In the examples, the term "part(s)" means "weight part(s)".

EXAMPLES 1 TO 7 AND COMPARATIVE EXAMPLE 3

(Preparation of Magnetic Coating Material A for the Upper Layer)

| | |
|---|---|
| Ferromagnetic alloy powder | 100 parts |
| Composition: Fe 70%, Co 30% (atom ratio) | |
| Hc: 183 kA/m | |
| Specific surface area: 55 m²/g | |
| σs: 140 Am²/kg | |

-continued

| | |
|---|---|
| Crystallite size: 155 nm | |
| Longer axis length: 0.065 μm | |
| Acicular ratio: 5 | |
| Sintering preventive agent: | |
| | |
| Aluminum compound (Al/Fe atom ratio 8%) | |
| Y compound (Y/Fe atom ratio 6%) | |
| Vinyl chloride type copolymer | 12 parts |
| (MR110; Nippon Zeon Co., Ltd.) | |
| Sulfonic acid-containing polyurethane resin | 3 parts |
| (UR8200; Toyobo Co., Ltd.) (solid matter) | |
| α-alumina (as shown in Table 2) | |
| Carbon black | 3 parts |
| (#50; Asahi Carbon Co., Ltd.) | |
| Compound given in Table 1 | |
| | |
| Stearic acid | 2 parts |
| Methyl ethyl ketone | 180 parts |
| Cyclohexanone | 180 parts |
| (Nonmagnetic coating material 2 for the lower layer) | |
| Nonmagnetic powder (Titanium oxide) | 80 parts |
| Crystal type: rutile | |
| Average primary particle size: 0.035 μm | |
| Specific surface area by BET method: 40 m²/g | |
| pH: 7 | |
| TiO₂ content: 90% or more | |
| DEP oil absorption: 27 to 38 g/100 g | |
| Surface treatment agent: Al₂O₃; 0.8 weight % | |
| Carbon black | 20 parts |
| Conductex SC-U (Columbia Carbon Co., Ltd.) | |
| Vinyl chloride type copolymer | 12 parts |
| (MR110; Nippon Zeon Co., Ltd.) | |
| Sulfonic acid-containing polyurethane resin | 5 parts |
| (UR8200; Toyobo Co., Ltd.) (solid matter) | |
| Compound given in Table 1 | |
| | |
| Stearic acid | 3 parts |
| Methyl ethyl ketone/cyclohexanone | 250 parts |
| (8/2 in weight ratio) | |

For each of the above coating materials, the components were kneaded using a kneader and the mixture was dispersed using a sand mill. To the dispersion solution thus obtained, polyisocyanate was added by 10 parts for the coating solution on the nonmagnetic layer, and by 10 parts to the coating solution for the magnetic layer. Further, 40 parts each of butyl acetate was added to each solution, and this was filtered using a filter with average bore size of 1 μm. Thus, the coating solutions for forming the nonmagnetic layer and for forming the magnetic layer were prepared.

The coating solution for the nonmagnetic layer thus prepared was coated by simultaneous multi-layer coating on a polyethylene terephthalate support member of 62 μm in thickness and 0.01 μm in surface roughness on the central line so that the thickness after drying was to be 1.5 μm and the thickness of the magnetic layer was to be 0.2 μm immediately thereafter. While both layers were still in wet condition, this was passed through an AC magnetic field generating system under the conditions of 50 Hz in frequency and 2.5 mT in magnetic field intensity and of 50 Hz in frequency and 1.2 mT in magnetic field intensity respectively to perform random orientation processing. After drying, this was processed by 7-stage calendering under the condition of 90° C. in temperature and 294 kN/m in linear pressure. This was punched to prepare a 3.7-type magnetic recording medium. After surface polishing, this was placed in a 3.7-type cartridge (for Zip Drive; Iomega Inc.) with a liner provided on inner side, and a 3.7-type floppy disk was prepared.

Each specimen of the floppy disks thus produced was measured by the evaluation methods given below.

(Evaluation Methods)
1. Reproduction Output
   Measurement of S/N ratio
   Using a disk evaluation system (RAW 1001; Guzik Inc., U.S.A.), a spin stand (LS-90; Kyodo Electronics System, Co., Ltd.), and a metal-in gap head of 0.3 μm in gap length, the specimen was placed at a position of 24.6 mm in radius. Reproduction output (TAA) at linear recording density of 90 kfci and noise after DC demagnetization were measured, and S/N ratio was obtained.
2. Durability
   Using a floppy disk drive (ZIP 100, Iomega, Inc.; number of revolutions 2968 rpm), the head was fixed at a position of 38 mm in radius. Recording was performed at recording density of 34 kfci, and the signal was reproduced, and this was regarded as 100%. Then, it was operated for 1,000 hours under thermo-cycle environment with the course of flow given below as one cycle. At every 24 hours of running operation, the output was measured. When the output was turned to 70% or less of the initial value, it was defined that the service life has expired.

Thermo-cycle Flow Test:

A. 25° C. and 50% relative humidity; one hour
   ↓ temperature increase  2 hours B. 60° C. and 20% relative humidity; 7 hours
   ↓ temperature decrease  2 hours C. 25° C. and 50% relative humidity; one hour
   ↓ temperature decrease  2 hours D. 5° C. and 10% relative humidity; 7 hours
   ↓ temperature increase  2 hours Then, the procedure was returned to A, and the cycle of A→B→C→D→A was repeated.

TABLE 1

| | Compound structure | $R^1$ | $R^2, R^3, R^4$ |
|---|---|---|---|
| Compound A | General formula (1) | —$C_2H_5$ | —$CH_2(CH_2)_3CH_3$ |
| Compound B | General formula (1) | —$C_2H_5$ | —$CH(CH_2CH_3)$ $(CH_2)_3CH_3$ |
| Compound C | General formula (1) | —$C_2H_5$ | —$CH_2(CH_2)_5CH_3$ |
| Compound D | General formula (1) | —$C_2H_5$ | —$CH_2(CH_2)_9CH_3$ |
| Compound E | General formula (1) | —$CH_3$ | —$CH_2(CH_2)_{13}CH_3$ |
| Compound F | General formula (2) | — | —$CH_2(CH_2)_9CH_3$ |
| Compound G | n-butylstearate | | |

TABLE 2

| | Compound | | Diamond | | α-alumina | | | |
|---|---|---|---|---|---|---|---|---|
| | Upper magnetic layer | Non-magnetic lower layer | Average particle size (μm) | Adding quantity (parts) | Adding quantity (μm) | Adding quantity (parts) | S/N (dB) | Durability (hr) |
| Example 1 | A | A | 0.25 | 3 | — | — | 5.2 | 1600 |
| Example 2 | B | B | 0.25 | 3 | — | — | 5 | 1700 |
| Example 3 | C | C | 0.25 | 3 | — | — | 5.6 | 1600 |
| Example 4 | D | D | 0.25 | 3 | — | — | 6.2 | 1500 |
| Example 5 | E | E | 0.25 | 3 | — | — | 5.8 | 1500 |
| Example 6 | F | F | 0.25 | 3 | — | — | 5.4 | 1500 |
| Example 7 | G | A | 0.25 | 3 | — | — | 5 | 1500 |
| Example 8 | A | A | 0.05 | 3 | — | — | 5.6 | 1500 |
| Example 9 | A | A | 1 | 3 | — | — | 5 | 1500 |
| Example 10 | A | A | 0.25 | 3 | 0.25 | 10 | 4 | 1700 |
| Comparative example 1 | A | A | — | — | 0.25 | 10 | 4.2 | 400 |
| Comparative example 2 | A | A | — | — | 0.25 | 20 | 2 | 700 |
| Comparative example 3 | A | A | — | — | 0.25 | 40 | 0 | 1300 |
| Comparative example 4 | G | G | 0.25 | 3 | — | — | 4 | 300 |
| Comparative example 5 | G | G | — | — | 0.25 | 20 | 3 | 200 |
| Comparative example 6 | A | A | — | — | 0.05 | 20 | 2.4 | 400 |
| Comparative example 7 | A | A | — | — | 1 | 20 | 1.6 | 700 |

As described above, according to the present invention, at least a specific type of an ester compound is used as a lubricant for the primer layer and diamond particles are added to the magnetic layer. As a result, electromagnetic transfer characteristics on the high-density recording medium can be improved, and durability can be increased on a high recording density disk type medium.

What is claimed is:

1. A magnetic recording medium, comprising a nonmagnetic primer layer placed on a nonmagnetic support member and at least one layer of magnetic layers with ferromagnetic powder dispersed in a binder, said magnetic layer being placed on said primer layer, whereby diamond particles with average particle size of 0.05 to 1 µm are added to the magnetic layer, and at least one type of compound selected from the following genera formulae (1) and (2) is contained:

General formula (1)

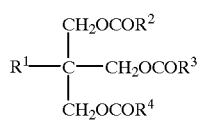

General formula (2)

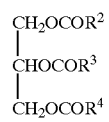

where $R^1$ represents an alkyl group having 1 to 2 carbon atoms; and $R^2$, $R^3$ and $R^4$ each represents a hydrocarbon group having 4 to 21 carbon atoms.

2. A magnetic recording medium according to claim 1, wherein thickness of said magnetic layer is in the range of 0.05 to 1 µm.

3. A magnetic recording medium according to one of claims 1 or 2, wherein the medium is a disk type magnetic recording medium.

* * * * *